Patented May 14, 1935

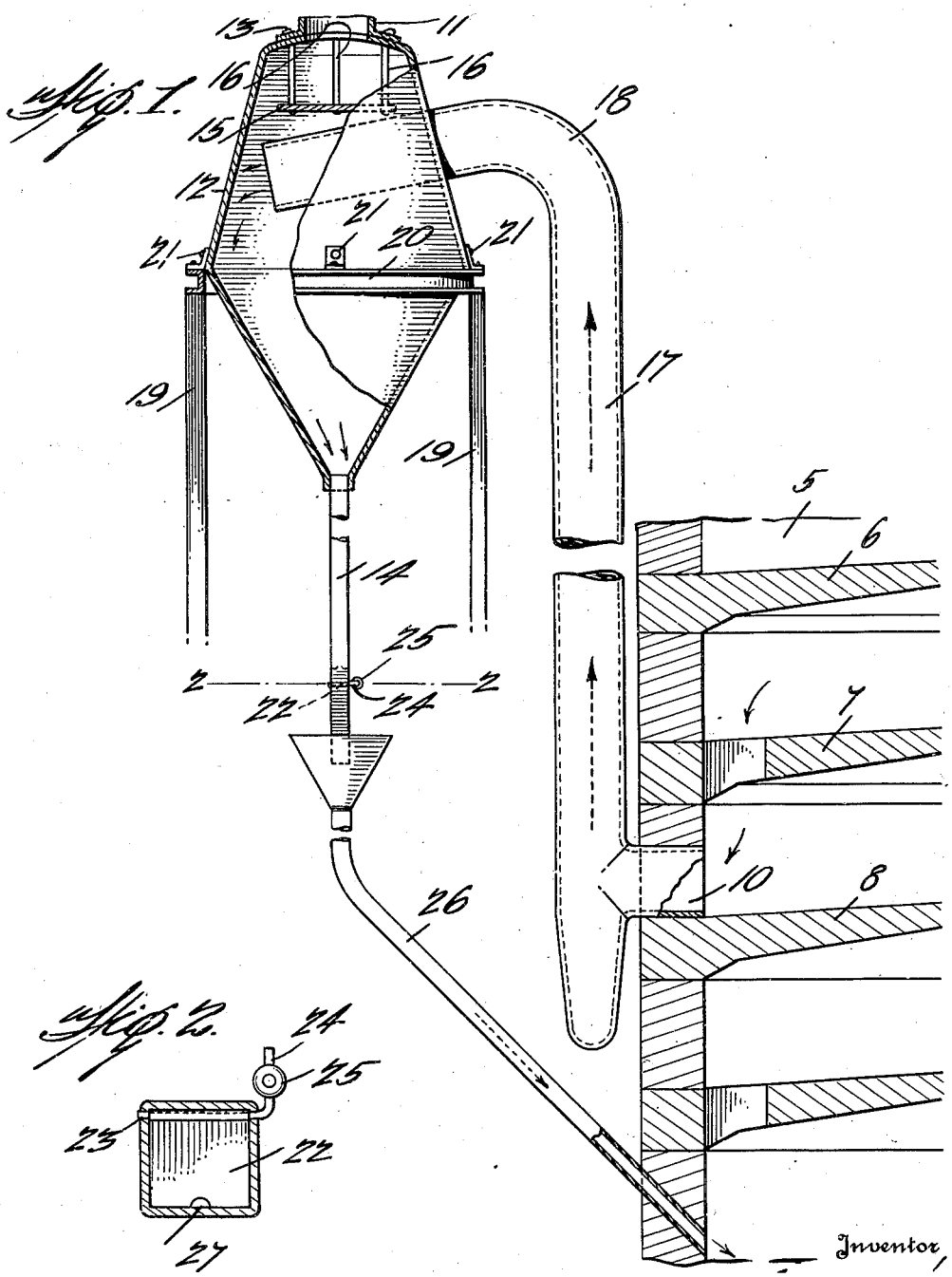

2,000,971

UNITED STATES PATENT OFFICE 2,000,971

COLLECTOR FOR FULLER'S EARTH

Bert Manross, Warren, Pa.

Application November 4, 1930, Serial No. 493,457

6 Claims. (Cl. 183—85)

This invention relates to apparatus for collecting fuller's earth, or particles thereof, carried in suspension by air currents issuing from furnaces in which said fuller's earth is being dried.

Fuller's earth for use by oil refineries is first washed and thereafter directed through a drier having a relatively high temperature, approximately 1000° F. such as a Nichols-Herreshoff furnace, which those familiar with the art will recognize as possessing a plurality of approximately horizontally disposed floors or hearths with spaces between them and that alternate ones of said floors or hearths are provided with openings at their outer and central zones, respectively, through which the fuller's earth drops to the next hearth, and that agitator blades are rotatively mounted and are operative to direct the fuller's earth toward the opening in each of the hearths so that the fuller's earth will fall onto the next lower floor until the bottom of the furnace is reached by the fuller's earth, from which point it is discharged ready for re-use.

Such a furnace has suitable burners and a stack for leading off the gaseous products of combustion. A substantial quantity of the fuller's earth being burned in the furnace becomes suspended in the gaseous products of combustion and is discharged from the furnace into the stack along with the gaseous products of combustion, and is ordinarily lost when discharged from the stack, thereby very materially reducing the quantity of the final available product of the burning.

It is an object of this invention to provide a collector interposed in the stack to intercept and collect the fuller's earth which is in suspension in the products of combustion from the stack; and which reduces and controls the draft at the top of the furnace in a manner to prevent undue flashing or burning of the fuller's earth therein which before introduction into the furnace is treated to decarbonize it.

It is another important object of my invention to provide a separator and collector which will not fracture or pulverize the fuller's earth particles but which will preserve their usefulness for oil refining and filtering purposes by protecting the porous cellular character of the particles even after many burnings subsequent to decarbonization.

It is a still further object of this invention to provide novel means whereby the fuller's earth collected by the collector is returned to the furnace at a point below that from which it escaped from the furnace; and other novel means whereby fuller's earth accumulated by the collector is effective to open a valve which permits the fuller's earth to pass gravitationally through a conduit and return to the furnace, at a level below that at which the fuller's earth was taken from the furnace, in a manner to avoid re-circulation of the returned fuller's earth in the stack.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which:—

Figure 1 is a view in elevation of a fragment of a furnace with a device embodying the invention applied thereto; and Figure 2 is a horizontal sectional view taken on the line 2—2 of Figure 1 and looking downwardly.

The furnace 5 is provided in one side with a stack opening 10 located above the partition 8 which divides the furnace into an upper section and a lower section. An arm of the stack 17 is in communication with the interior of the upper section through the opening 10. An upper part of the stack 17 has a gooseneck 18 whose open lower end is located within the upper part of the collector casing 12. The casing 12 has an opening in its top 13 with which a stack portion 11 is in communication. The casing walls are outwardly and downwardly flared from the top to approximately its middle from which they converge toward the bottom and open into a depending pipe 14, through which the fuller's earth which accumulates in the casing passes.

A baffle plate 15 substantially the size of the opening in the top 13 is suspended from the top by rods 16 to impede direct passage of air and products of combustion to the stack portion 11 whereby the velocity of the escaping air and products of combustion is reduced so as to prevent excessive draft in the furnace. The gooseneck also functions to slow down the draft without shutting off the draft. The air cushions thus formed and trapped in the stack and in the collector have a damping effect on explosions and flare-ups within the upper section of the furnace such as may be brought about by flashing.

The open end of the gooseneck 18 is located close to the flared wall of the upper part of the casing whereby the gaseous products of combustion carrying the fuller's particles will flow downwardly against the said flared wall and be further downwardly deflected thereby into the lower part of the casing in a whirling motion. The relatively gentle motion of the products issuing from the open end of the gooseneck combined with the angulated relation of the gooseneck and the wall of the casing facilitates separation and prevents fracturing and pulverization of the fuller's earth particles which would render them unfit for use in oil refining processes.

The collector casing 12 is mounted in a supporting ring 20 by brackets 21 attached to the casing and resting on the ring, the ring being supported in an elevated position by a frame 19.

Intermediate the ends of the pipe 14 is a valve 22 mounted on a shaft 23 and normally closed by a weighted arm 24, 25. When enough fuller's earth has collected in the pipe 14 to overcome the effect of the weight 25 the valve will be swung open momentarily and permit some of the fuller's earth collected in the pipe 14 to escape into an angulated chute 26 whose lower end traverses the wall of the lower section of the furnace and communicates with the interior of the furnace at a point below the partition 8. Since the partition has no side opening at this point, the fuller's earth delivered by the chute 26 will be protected against being drawn up into the stack 17 and recirculated through the collector for no immediately useful purpose, and to the probable detriment of the fuller's earth.

In practice a device embodying the invention has resulted in a very material and valuable saving of fuller's earth which is usually lost while undergoing the treatments heretofore mentioned.

The stack 17 is of such height and cross section that by virtue of its connection to the upper section of the furnace and the rising of the products of combustion therein, the stack will be sufficiently heated to preclude the formation of condensation therein. The importance of obviating condensation in the stack will be understood when it is considered that moisture caused by condensation would be carried over into the separator casing and cause the separated particles to pack and sludge to such an extent that the accumulated particles would not pass out of the separator casing under their own weight and would have to be shovelled out. The separator casing is so arranged and constructed that the dry highly heated products of combustion entering the separator casing by the gooseneck 18 sufficiently heat the interior of the casing and the baffle 15 so that condensation is prevented within the separator casing and gooseneck. It will be obvious that it is equally, if not more, important that the interior of the separator casing be kept hot and free of moisture so that a proper separation of the particles will take place and to ensure that the separated and collected particles will remain separated and in a free flowing dry condition. If the particles as they come into the separator casing are wet they cannot be properly separated but will simply fall to the bottom of the casing and form a sludge which will plug the conduits 14 and 26 and render the apparatus partly or completely inoperative until cleaned out at great expense and loss of operating time. I understand that an inefficient condition of this kind is one of the greatest objections to presently used devices of this kind. My apparatus, however, is not subject to these objections, but maintains a highly efficient operating condition over an indefinitely long period of time and recovers and enables the reconditioning and reuse of a larger percentage of the decarbonized fuller's earth than has heretofore been possible.

The importance of providing in my invention the means described whereby fracture and pulverization of the fuller's earth particles is avoided will be understood when it is realized that in order to be useful for oil refining purposes the fuller's earth particles must retain their original porous, absorptive, cellular character through any process of reconditioning or rejuvenating thereof, and that the particles will be wholly useless for these purposes if fractured or pulverized during or as a result of the process. Since it can be shown that my apparatus enables the reburning or rejuvenating of decarbonized fuller's earth used for oil refining purposes on an average of thirty-two (32) times as against an average of eight (8) times possible with other apparatus, before the fuller's earth becomes unfit for this use, the superiority of my apparatus is clearly established, especially since my apparatus enables the recovery and reuse of a large percentage of the fuller's earth now being lost in the best available apparatus.

Reference made herein to prevention of flashing of the decarbonized fuller's earth as it enters the upper section of the furnace is further explained by stating that in conventional fuller's earth rejuvenating processes as in the present invention, the fuller's earth is treated with decarbonizing material to remove the hydrocarbon and other sludge absorbed by the fuller's earth during its use in the oil refining operations. At the termination of the decarbonizing there remains in the fuller's earth a certain amount of the readily inflammable decarbonizing material. When this fuller's earth is introduced into ordinary furnaces, it quickly ignites and flashes with sufficient of an explosion to cause a heavy upward draft through the stack of the furnace which, being unimpeded, encourages a continuance of the ignition which impairs the fuller's earth. In my apparatus, when such flashing of the decarbonized fuller's earth commences, the accompanying uprush of pressure through the stack 8 is met by a cushion of air trapped in the upper part of the stack and in the separator casing by virtue of the construction already described, which checks this unusual updraft in the stack and damps the flashing in a manner unfavorable of a continuance thereof. This automatic checking of flashing in the upper section of the furnace not only very advantageously controls and imparts regularity to the draft through the apparatus, but prevents impairment of considerable portions of the charge in the furnace and ensures a more uniform final product of higher grade.

It will be observed that no artificial or forced draft assistance is given the natural draft which takes the fuller's earth out of the upper section of the furnace, passes it through the separator, and permits it to return to the lower section of the furnace, and that the entire circulation is achieved and maintained by natural circulation and the force of gravity, a circumstance which makes my very efficient apparatus cheaper to operate and maintain than any other similar device known to me.

I claim:

1. A collector for interpolation between a drier and its stack comprising a casing having an inverted conical lower portion and a dome-like upper portion provided with a stack connecting opening, a baffle beneath the stack opening, a pipe leading from the drier, a downwardly angular portion on the pipe passing through one side of the casing to a point near the opposite side of the casing below the baffle, a particle receiving conduit depending from the lower portion of the casing, a valve in the conduit openable by a predetermined weight of particles thereon, and means for conveying to the drier particles which have passed the valve.

2. A collector for interpolation between a drier and its stack comprising a casing having an inverted conical lower portion and a dome-like upper portion provided with a stack connecting opening, a baffle beneath the stack opening, a pipe leading from the drier, a downwardly angular portion on the pipe passing through one side of the casing to a point near the opposite side of the casing below the baffle, a particle receiving conduit depending from the lower portion of the casing, a valve in the conduit openable by a predetermined weight of particles thereon, and means for conveying to the drier particles which have passed the valve, and support means for supporting the casing at an elevated position with respect to the drier whereby the particles gravitate from the casing to the drier.

3. A collector for interpolation between a drier or the like and its stack for collecting particles in suspension in discharged gases, said collector comprising a casing supported in a position of elevation with respect to the drier or the like, a stack connection on the casing, a baffle for baffling direct passage of gases from the casing to the stack and for preventing an increase in the draft through the stack, a pipe leading from the stack opening of the drier or the like, an angularly downwardly directed portion on an upper part of the pipe passed through one side of the casing to a point near the opposite side of the casing below the baffle for directing the gases received from the drier downwardly against the side of the casing, a particle receiving conduit depending from the lower portion of the casing, a valve closing the conduit for creating a dead-air space thereabove into which the gases received from the drier or the like are directed by the said pipe whereby the gravitational separation of particles from the gases is conditioned, said valve being openable by a predetermined weight of particles thereon for discharging the particles.

4. A collector for interpolation between a drier or the like and its stack for collecting particles in suspension in discharged gases, said collector comprising a casing supported in a position of elevation with respect to the drier or the like, a stack connection on the casing, a baffle for baffing direct passage of gases from the casing to the stack and for preventing an increase in the draft through the stack, a pipe leading from the stack opening of the drier or the like, an angularly downwardly directed portion on an upper part of the pipe passed through one side of the casing to a point near the opposite side of the casing below the baffle for directing the gases received from the drier downwardly against the side of the casing, a particle receiving conduit depending from the lower portion of the casing, a valve closing the conduit for creating a dead-air space thereabove into which the gases received from the drier or the like are directed by the said pipe whereby the gravitational separation of particles from the gases is conditioned, said valve being openable by a predetermined weight of particles thereon for discharging the particles, and means for conveying the discharged particles to the drier or the like.

5. A device for separating solid particles from gaseous products of combustion, said device comprising a closed casing provided with a discharging opening in its upper part, a baffle for and spaced below said discharging opening and preventing direct rise of said products and the solid particles entrained therein through said discharging opening, a goose-neck equipped conduit leading from a source of said products, the goose-neck having a downwardly directed portion traversing one side of said casing and discharging close to the opposite side of the interior of said casing at a point below said baffle, said goose-neck acting to decelerate the movement of said products in said conduit so as to cause said products and the solid particles entrained therein to flow relatively softly from the lower end of said downwardly directed portion of the gooseneck, whereby said products and the solid particles suspended therein are softly impinged at an angle against the said opposite side of the interior of the casing so as to be downwardly directed into the lower part of the casing without being fractured or pulverized, normally closed particle collecting and discharging means on the lower part of said casing, said means creating a dead-air space in the lower part of the casing receiving the downwardly directed particles whereby said particles are caused to separate gravitationally from said products of combustion and collect in said particle collecting and discharging means.

6. A device for separating solid particles entrained in gaseous products of combustion, said device comprising a closed casing having a conical upper part provided with an opening for discharging said products of combustion and a lower part equipped with normally closed solid particle receiving and discharging means creating a dead-air space in said lower part of the casing, a conduit from a source of said products, said conduit having a gooseneck portion effective to decelerate the natural movement of said products through said conduit, a portion of said gooseneck being downwardly angulated and traversing one side of the upper part of said casing, the open lower end of said portion of the gooseneck being located close to the opposite side of the interior of said casing, whereby said products and the solid particles entrained therein are gently flowed against the interior of the casing in a downward direction so as to avoid fracturing said particles and so as to cause positive downward circulation thereof in said dead-air space, said dead-air space being arranged to cause gravitational separation of said particles from said products of combustion and collection of said particles in said lower part of the casing and in said receiving and discharging means.

BERT MANROSS.